United States Patent
Walker, II

(10) Patent No.: US 10,986,220 B2
(45) Date of Patent: Apr. 20, 2021

(54) DEVICE FOR RADIO COMMUNICATIONS AND METHOD FOR ESTABLISHING AND MAINTAINING COMMUNICATIONS BETWEEN DEVICE AND FIXED LOCATION RADIO COMMUNICATION FACILITIES

(71) Applicant: John Thomas Walker, II, Dublin, OH (US)

(72) Inventor: John Thomas Walker, II, Dublin, OH (US)

(73) Assignee: John Thomas Walker, II, Dublin, OH (US)

( * ) Notice: Subject to any disclaimer, the term of this patent is extended or adjusted under 35 U.S.C. 154(b) by 40 days.

(21) Appl. No.: 16/374,270

(22) Filed: Apr. 3, 2019

(65) Prior Publication Data

US 2019/0289103 A1    Sep. 19, 2019

Related U.S. Application Data

(63) Continuation-in-part of application No. 15/980,187, filed on May 15, 2018, now Pat. No. 10,512,017.

(60) Provisional application No. 62/506,856, filed on May 16, 2017.

(51) Int. Cl.
*H04W 4/00* (2018.01)
*H04M 1/02* (2006.01)
*H04N 21/414* (2011.01)
*H04N 21/258* (2011.01)
*H04N 21/61* (2011.01)

(52) U.S. Cl.
CPC ...... *H04M 1/026* (2013.01); *H04N 21/25841* (2013.01); *H04N 21/41407* (2013.01); *H04N 21/6143* (2013.01)

(58) Field of Classification Search
CPC ............ H04M 1/026; H04N 21/25841; H04N 21/41407; H04N 21/6143; G06F 9/4408
See application file for complete search history.

(56) References Cited

U.S. PATENT DOCUMENTS 6,490,722 B1 * 12/2002 Barton ................ G06F 11/1417
  348/E5.103
6,606,506 B1 * 8/2003 Jones ..................... H04B 1/207
  455/556.1

(Continued)

Primary Examiner — Stephen M D Agosta
(74) Attorney, Agent, or Firm — Locke Lord LLP; Tim Tingkang Xia, Esq.

(57) ABSTRACT

A mobile or transportable device for radio communications include a mobile platform. The mobile platform has at least one antenna; a radio operating component coupled with the at least one antenna for receiving and/or transmitting radio signals; and a microcontroller coupled with the radio operating component, configured such that when a radio signal received by the radio operating component from one of fixed location radio communication facilities is weaker than a threshold value, the microcontroller searches radio communication parameters of a closest radio communication facility to a current location of the mobile or transportable device, and operably retunes the mobile or transportable device according to the radio communication parameters of the closest radio communication facility. According to the invention, certain functions of the mobile or transportable device may be performed remotely away from the mobile platform.

15 Claims, 5 Drawing Sheets

(56) References Cited

U.S. PATENT DOCUMENTS

| | | | | |
|---|---|---|---|---|
| 6,651,188 B2* | 11/2003 | Harding | G06F 11/1417 | 714/38.13 |
| 7,127,596 B2* | 10/2006 | Rich | G06F 9/4406 | 713/1 |
| 7,424,419 B1* | 9/2008 | Fike | G06F 13/385 | 703/23 |
| 8,566,435 B1* | 10/2013 | Kothandapani | G06F 11/3051 | 709/223 |
| 8,655,351 B2* | 2/2014 | Sinton | H04M 1/6091 | 455/426.1 |
| 9,542,195 B1* | 1/2017 | Astarabadi | G06F 9/4401 | |
| 9,563,418 B1* | 2/2017 | Walton | G06F 8/654 | |
| 10,346,187 B1* | 7/2019 | Trier | G06F 9/455 | |
| 2005/0228888 A1* | 10/2005 | Mihm | G06F 8/65 | 709/227 |
| 2006/0156209 A1* | 7/2006 | Matsuura | H04M 1/72552 | 714/798 |
| 2007/0169088 A1* | 7/2007 | Lambert | G06F 11/0709 | 717/168 |
| 2008/0009314 A1* | 1/2008 | Okamoto | H04M 1/21 | 455/556.1 |
| 2008/0168244 A1* | 7/2008 | Chu Chen | G06F 11/1417 | 711/162 |
| 2008/0214238 A1* | 9/2008 | Rokusek | H04H 20/61 | 455/557 |
| 2008/0232446 A1* | 9/2008 | Baker | H03L 7/085 | 375/219 |
| 2008/0233892 A1* | 9/2008 | Marholev | H04B 1/403 | 455/77 |
| 2008/0261538 A1* | 10/2008 | Korner | H01Q 9/16 | 455/73 |
| 2009/0247096 A1* | 10/2009 | Walley | H04H 60/27 | 455/142 |
| 2010/0035587 A1* | 2/2010 | Bennett | H04W 12/06 | 455/414.1 |
| 2010/0144294 A1* | 6/2010 | Han | H03J 1/0066 | 455/186.1 |
| 2010/0285732 A1* | 11/2010 | Sinton | H04H 20/62 | 455/3.01 |
| 2011/0176582 A1* | 7/2011 | Hammes | G01S 19/235 | 375/150 |
| 2014/0342756 A1* | 11/2014 | Houri | H04W 4/021 | 455/456.2 |
| 2015/0143095 A1* | 5/2015 | Maity | G06F 11/1417 | 713/2 |
| 2017/0270301 A1* | 9/2017 | Vidyadhara | G06F 21/575 | |
| 2017/0322816 A1* | 11/2017 | Parthiban | G06F 9/4401 | |
| 2018/0183653 A1* | 6/2018 | Chew | H04L 41/0654 | |
| 2019/0289103 A1* | 9/2019 | Walker, II | H04N 21/44209 | |

* cited by examiner

DEVICE FOR RADIO COMMUNICATIONS AND METHOD FOR ESTABLISHING AND MAINTAINING COMMUNICATIONS BETWEEN DEVICE AND FIXED LOCATION RADIO COMMUNICATION FACILITIES

CROSS-REFERENCE TO RELATED PATENT APPLICATIONS

This application is a continuation-in-part application of U.S. patent application Ser. No. 15/980,187, filed May 15, 2018, which itself claims priority to and the benefit of, pursuant to 35 U.S.C. § 119(e), U.S. Provisional Patent Application Ser. Nos. 62/506,856, filed May 16, 2017, which are incorporated herein in their entireties by reference.

FIELD OF THE INVENTION

The invention relates generally to the field of radio frequency communications, and more particularly, to a mobile or transportable device for radio communications and method for establishing and maintaining communications between device and fixed location radio communication facilities.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

There exists a set of problems associated with establishing and/or maintaining radio communications between a mobile or transportable radio communication device and fixed location radio communication facilities. These problems center on difficulties of identifying and tuning fixed radio communication facilities when arriving in a new local, and as the mobile or transportable radio communication device moves from one location to another, relative to fixed location radio communication facilities. Fixed radio communication devices have propagation limitations dependent upon a set of factors, some of which cannot be altered. As a result, in various relative locations, a mobile or transportable radio device cannot communicate with certain fixed location radio devices. Satellite radio broadcast facilities were, in part, designed, developed, and built to overcome this problem.

Examples of the essential problem include but are not limited to the following: an automobile driving form one city to another may experience the loss of an AM or FM radio broadcast because the vehicle travels beyond the propagation range of a specific station. A National Public Radio broadcast from the Cleveland, Ohio area may not be received by an automobile radio once it travels beyond the reception range going south towards Columbus, Ohio. However, if the driver were to tune in another National Public Radio station, located in Mansfield, Ohio, the automobile occupants may continue to listen to the same broadcast programming, because the NPR system of broadcasting stations simultaneously transmits the same program. However, if the driver does not know the broadcast frequency of the Mansfield station, the driver will need to locate it by tuning the radio and listening for the specific broadcast program. This could result in missing program segments and/or distracted driving.

Amateur radio operators have erected automatic repeater stations and transceivers (2 Meter, 220 Megahertz and 440 Megahertz) in most metropolitan areas in the United States and other countries. These repeater stations are inherently short range, normally less than 20 miles. These automated stations work on differing frequencies and utilize differing operating protocols. While this information is published through many sources and is available on the internet, the stations' operating data must be inserted manually. If there are a large number of repeaters in a given area, say 25 to 50, it is a burden to the operator of a mobile station to manually insert all of this information, as the driver enters a new operating area. Additionally, some of these repeater stations are designated to support emergency communication services, and these designations are also published.

Boaters travelling from one area to another may want to communicate by marine radio to local marine facilities to talk to a local marine service provider that can offer a specific service. That boater may be required to look up the frequency that the local marina has designated for a specific use and then tune his radio to the appropriate channel/frequency.

There are over fifteen thousand AM and FM broadcast stations located throughout the United States alone. And that number has been increasing each year over the last fifteen years. There are many more worldwide. Every day millions of drivers in the United States drive distances which will transport them beyond the propagation range of AM and FM broadcast stations located in one location; yet much of the broadcast program material is being simultaneously broadcast from other locations, and in many instances, frequency knowledge and retuning the radio could maintain continuous reception of the program.

Therefore, a heretofore unaddressed need exists in the art to address the aforementioned deficiencies and inadequacies.

SUMMARY OF THE INVENTION

In one aspect, the invention relates to a mobile or transportable device for radio communications. In one embodiment, the mobile or transportable device includes at least one antenna; a radio operating component coupled with the at least one antenna for receiving and/or transmitting radio signals; a database containing radio communication parameters of fixed location radio communication facilities, wherein the radio communication parameters comprise a location, transmitting power, hours of operation, antenna parameter, frequency, modulation type, and connection protocol of each of the fixed location radio communication facilities; a location determining component for determining its current location of the mobile or transportable device; and a computer component coupled with the radio operating component, the database and the location determining component, configured such that when a radio signal received by the radio operating component from one of the fixed location radio communication facilities is weaker than a threshold value, the computer component searches the database to find radio communication parameters of a fixed location radio communication facility that is the closest radio communication facility to the current location of the mobile or transportable device, and operably retunes the mobile or transportable device according to the radio communication parameters of the closest radio communication facility.

In one embodiment, the mobile or transportable device further includes an output component for audio output, video output, data output, text output, or a combination thereof, wherein the output component comprises one or more speakers, one or more headphones, one or more displays, one or more video devices, or a combination thereof.

In one embodiment, the mobile or transportable device further includes a user interface component for inputting user instructions, wherein to the user interface component comprises a key pad, a touch screen, a voice recognition system, electronic switches and buttons, or motion sensing devices and switches.

In one embodiment, the mobile or transportable device further includes a signal sampling circuitry for performing pattern identification and pattern recognition of radio broadcast programming.

In one embodiment, the radio operating component comprises one or more receivers, one or more transmitters, one or more transceivers, or a combination thereof.

In one embodiment, the radio operating component comprises a primary receiver for receiving the radio signal from one of the fixed location radio communication facilities and a secondary receiver for continuously scanning a relevant radio frequency spectrum in order to sense and confirm which one of the fixed location radio communication facilities presents in the database is reliably usable at the current location of the mobile or transportable device.

In one embodiment, the radio operating component operates using spread spectrum communication protocols.

In one embodiment, the radio operating component is capable of receiving radio communications from an earth orbiting satellite broadcast facility in order to expand program selection and choices.

In one embodiment, the location determining component comprises a global positioning system (GPS) based locator, an inertial guidance system, or a terrain recognition system.

In one embodiment, the database is operably changeable and updateable through linkage to the internet by smart phones, smart phone networks, radio broadcast, satellite radio broadcast, or by insertion of a portable memory device.

In one embodiment, the radio communication parameters further comprise radio or TV broadcast program schedules associated with each of the fixed location radio communication facilities.

In one embodiment, the radio communication parameters further comprise information of programs and program schedules that are broadcast in duplicate and simultaneously by multiple radio communication facilities in different locations.

In one embodiment, the database contains information organized in a matrix pattern of adjoining squares defined by geographic longitude and latitude coordinates that cover a defined geographic area, wherein each matrix square is populated by data with digital designations of fixed location radio communication facilities that are detectable, based on signal strength, when the mobile or transportable device locates in that specific geographic matrix square, wherein for each radio communication facility there is a digital representation of the probable signal strength present at current time in each matrix square based upon calculations using the published propagation maps of the fixed location broadcast facilities, or by calculations based upon terrain, distance between the mobile or transportable device and the broadcast station, respective transmit power, frequency, modulation type, and antenna gain.

In one embodiment, the database contains digital identifying codes that categorize program content of broadcast into groups including sports commentary, football games, baseball games, basketball games, religious news, religious programming, alt-right news, alt-left news, syndicated news commentary, network news, programming in Spanish and other languages, music programming and specifically types of music programming including retro rock music, oldies rock music, modern country, retro country, bluegrass; and other types of broadcast programming groups or categories.

In one embodiment, the digital identifying codes identify those fixed location broadcast facilities that carry specific program content that is simultaneously broadcast at multiple fixed location radio communication facilities.

In one embodiment, the mobile or transportable device is connectable to the internet using a smart phone, a direct hardwire connection, or a radio frequency link including Bluetooth so that the mobile or transportable device is operably accessible to broadcasting of digital radio stations on the internet in order to expand program selections and choices and to provide additional connectivity to syndicated or simultaneous broadcast programs that are used when other means of program reception fails.

In another aspect, the invention relates to a method for automatically retuning a specific broadcast program from a first fixed location radio communication facility to a second fixed location radio communication facility for a mobile or transportable device.

In one embodiment, the method includes instructing the mobile or transportable device to stay on a specific broadcast program; monitoring, by the mobile or transportable device, a radio signal of the specific broadcast program broadcast from the first fixed location radio communication facility, when the radio signal is weaker than a threshold value, the mobile or transportable device searches a database thereof to find radio communication parameters of the second fixed location radio communication facility that broadcasts the same program as the specific broadcast program and locates most closely to the current location of the mobile or transportable device; and operably retuning the mobile or transportable device in the specific broadcast program broadcast from the first fixed location radio communication facility to the second fixed location radio communication facility according to the radio communication parameters of the second fixed location radio communication facility.

In one embodiment, the method further includes establishing the rate and direction of travel of the mobile or transportable device by reviewing the previous travel path of the mobile or transportable device; projecting its future travel area of the mobile or transportable device; and selecting a new fixed location radio communication facility according to the strength of the radio signal in the future travel area utilizing broadcast propagation data in the database of the mobile or transportable device.

In one embodiment, the method further includes selecting of a group of fixed location radio communication facilities in a given locality specified by their common use mode.

In one embodiment, the method further includes selecting a local group of fixed location repeater stations or transceivers that are operably communicable with given limits of propagation and reception of the mobile or transportable device and the fixed location repeater stations; and retrieving local repeater station frequency and operating protocols from the database, so as to enable the user to scan, monitor, and use the local repeater stations for communication or emergency use.

In one embodiment, the method further includes selecting a group of broadcast stations broadcasting a category of program material or content and to scan those stations until the user selects via input/command one station.

In one embodiment, the method further includes calculating a transmitted signal strength of a fixed location radio communication facility at the current location of the mobile or transportable device according to a formula of $$RPD=P*G/(4*\pi*D)^2,$$

wherein RPD is a receiver power density, P is a transmitted power, G is a transmitting antenna gain, and D is a distance between the transmitter of the fixed location radio communication facility and the receiver of the mobile or transportable device, and wherein RPD is measured in Watts per square meter.

In yet another aspect, the invention relates to a non-transitory tangible computer-readable medium storing instructions which, when executed by one or more processors, cause a mobile or transportable device to perform a method for automatically retuning a specific broadcast program from a first fixed location radio communication facility to a second fixed location radio communication facility.

In one embodiment, the method includes instructing the mobile or transportable device to stay on a specific broadcast program; monitoring, by the mobile or transportable device, a radio signal of the specific broadcast program broadcast from the first fixed location radio communication facility, when the radio signal is weaker than a threshold value, the mobile or transportable device searches a database thereof to find radio communication parameters of the second fixed location radio communication facility that broadcasts the same program as the specific broadcast program and locates most closely to the current location of the mobile or transportable device; and operably retuning the mobile or transportable device in the specific broadcast program broadcast from the first fixed location radio communication facility to the second fixed location radio communication facility according to the radio communication parameters of the second fixed location radio communication facility.

In one embodiment, the method further includes establishing the rate and direction of travel of the mobile or transportable device by reviewing the previous travel path of the mobile or transportable device; projecting its future travel area of the mobile or transportable device; and selecting a new fixed location radio communication facility according to the strength of the radio signal in the future travel area utilizing broadcast propagation data in the database of the mobile or transportable device.

In one embodiment, the method further includes selecting of a group of fixed location radio communication facilities in a given locality specified by their common use mode.

In one embodiment, the method further includes selecting a local group of fixed location repeater stations or transceivers that are operably communicable with given limits of propagation and reception of the mobile or transportable device and the fixed location repeater stations; and retrieving local repeater station frequency and operating protocols from the database, so as to enable the user to scan, monitor, and use the local repeater stations for communication or emergency use.

In one embodiment, the method further includes selecting a group of broadcast stations broadcasting a category of program material or content and to scan those stations until the user selects via input/command one station.

In one embodiment, the method further includes calculating a transmitted signal strength of a fixed location radio communication facility at the current location of the mobile or transportable device according to a formula of $$RPD=P*G/(4*\pi*D)^2,$$

wherein RPD is a receiver power density, P is a transmitted power, G is a transmitting antenna gain, and D is a distance between the transmitter of the fixed location radio communication facility and the receiver of the mobile or transportable device, and wherein RPD is measured in Watts per square meter.

In one aspect of the invention, a mobile or transportable device for radio communications comprises a mobile platform. The mobile platform comprises at least one antenna; a radio operating component coupled with the at least one antenna for receiving and/or transmitting radio signals; and a microcontroller coupled with the radio operating component, configured such that when a radio signal received by the radio operating component from one of fixed location radio communication facilities is weaker than a threshold value, the microcontroller searches radio communication parameters of a closest radio communication facility to a current location of the mobile or transportable device, and operably retunes the mobile or transportable device according to the radio communication parameters of the closest radio communication facility.

In one embodiment, the mobile platform further comprises an output component for audio output, video output, data output, text output, or a combination thereof, wherein the output component comprises one or more speakers, one or more headphones, one or more displays, one or more video devices, or a combination thereof.

In one embodiment, the mobile platform further comprises a user interface component for inputting user instructions, wherein the user interface component comprises a keypad, a touch screen, a voice recognition system, electronic switches and buttons, or motion sensing devices and switches.

In one embodiment, the radio operating component comprises one or more receivers, one or more transmitters, one or more transceivers, or a combination thereof.

In one embodiment, the radio operating component comprises a primary receiver for receiving the radio signal from one of the fixed location radio communication facilities and a secondary receiver for continuously scanning a relevant radio frequency spectrum in order to sense and confirm which one of the fixed location radio communication facilities is reliably usable at the current location of the mobile or transportable device.

In one embodiment, the radio operating component is capable of receiving radio communications from an earth orbiting satellite broadcast facility in order to expand program selection and choices.

In one embodiment, the mobile or transportable device further comprises a location determining component for determining its current location of the mobile or transportable device.

In one embodiment, the location determining component comprises a global positioning system (GPS) based locator, an inertial guidance system, a terrain recognition system, or a smart phone.

In one embodiment, the location determining component is integrated in the mobile platform, or an individual component, and is in communication with the mobile platform through a wired communication protocol, a wireless communication protocol, a radio communication protocol, and/or an internet communication protocol.

In one embodiment, a cell phone network is used to calculate the location of the mobile platform in which the mobile or transportable device is currently located and to communicate by radio transmission that location information to the mobile or transportable device.

In one embodiment, the mobile or transportable device further comprises at least one data server containing radio communication parameters of the fixed location radio communication facilities that operably are searchable by the microcontroller, wherein the radio communication parameters comprise a location, transmitting power, hours of operation, antenna parameter, frequency, modulation type, and connection protocol of each of the fixed location radio communication facilities.

In one embodiment, the radio communication parameters further comprise radio or TV broadcast program schedules associated with each of the fixed location radio communication facilities, and/or information of programs and program schedules that are broadcast in duplicate and simultaneously by multiple radio communication facilities in different locations.

In one embodiment, the at least one data server is operably changeable and updateable by smart phones, smart phone networks, radio broadcast, satellite radio broadcast.

In one embodiment, the at least one data server comprises one or more databases, and/or one or more cloud servers.

In one embodiment, the at least one data server comprises one or more portable memory devices.

In one embodiment, the at least one data server contains information organized in a matrix pattern of adjoining squares defined by geographic longitude and latitude coordinates that cover a defined geographic area, wherein each matrix square is populated by data with digital designations of fixed location radio communication facilities that are detectable, based on signal strength, when the mobile or transportable device locates in that specific geographic matrix square, wherein for each radio communication facility there is a digital representation of the probable signal strength present at current time in each matrix square based upon calculations using the published propagation maps of the fixed location broadcast facilities, or by calculations based upon terrain, distance between the mobile or transportable device and the broadcast station, respective transmit power, frequency, modulation type, and antenna gain.

In one embodiment, the at least one data server contains digital identifying codes that categorize program content of broadcast into groups including sports commentary, football games, baseball games, basketball games, religious news, religious programming, alt-right news, alt-left news, syndicated news commentary, network news, programming in Spanish and other languages, music programming and specifically types of music programming including retro rock music, oldies rock music, modern country, retro country, bluegrass; and other types of broadcast programming groups or categories, wherein the digital identifying codes identify those fixed location broadcast facilities that carry specific program content that is simultaneously broadcast at multiple fixed location radio communication facilities.

In one embodiment, the at least one data server is in communication with the mobile platform through a wired communication protocol, a wireless communication protocol, a radio communication protocol, and/or an internet communication protocol.

In one embodiment, the mobile or transportable device further comprises a signal sampling circuitry for performing pattern identification and pattern recognition of radio broadcast programming.

In one embodiment, the mobile or transportable device is connectable to the internet using a smart phone, a direct hardwire connection, or a radio frequency link including Bluetooth so that the mobile or transportable device is operably accessible to broadcasting of digital radio stations on the internet in order to expand program selections and choices and to provide additional connectivity to syndicated or simultaneous broadcast programs that are used when other means of program reception fails.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
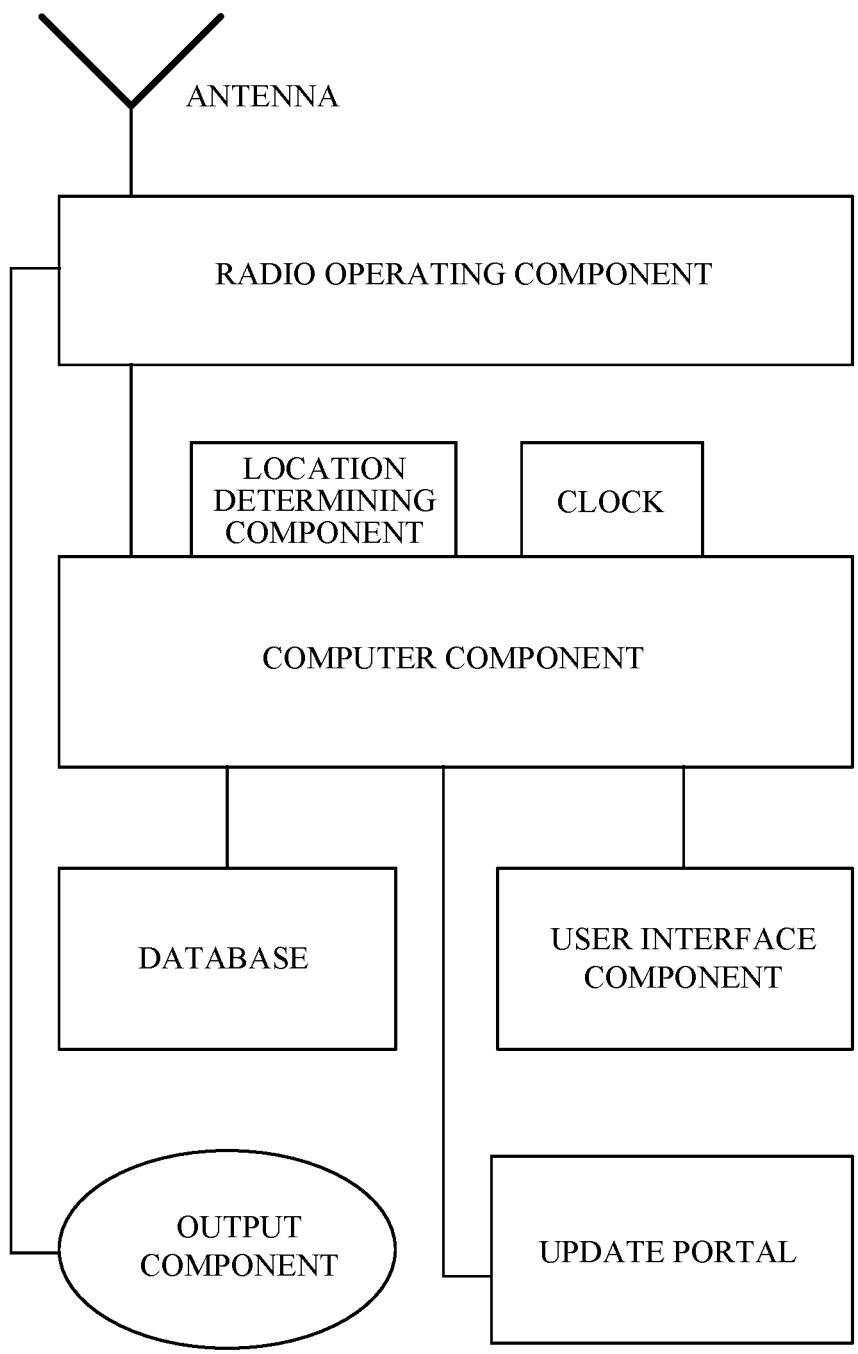
FIG. 1 shows schematically a mobile or transportable device for radio communications according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Referring to FIG. 1, a mobile or transportable device for radio communications is shown according to one embodiment of the invention. In this exemplary embodiment, the mobile or transportable device includes at least one antenna; a radio operating component coupled with the at least one antenna for receiving and/or transmitting radio signals; a database containing radio communication parameters of fixed location radio communication facilities, where the radio communication parameters comprise a location, transmitting power, hours of operation, antenna parameter, frequency, modulation type, and connection protocol of each of the fixed location radio communication facilities; a location determining component for determining its current location of the mobile or transportable device; and a computer component coupled with the radio operating component, the database and the location determining component, configured such that when a radio signal received by the radio operating component from one of the fixed location radio communication facilities is weaker than a threshold value, the computer component searches the database to find radio communication parameters of a fixed location radio communication facility that is the closest radio communication facility to the current location of the mobile or transportable device, and operably retunes the mobile or transportable device according to the radio communication parameters of the closest radio communication facility.

The mobile or transportable device further includes an output component for audio output, video output, data output, text output, or a combination thereof, wherein the output component comprises one or more speakers, one or more headphones, one or more displays, one or more video devices, or a combination thereof.

The mobile or transportable device further includes a user interface component for inputting user instructions, wherein the user interface component comprises a key pad, a touch screen, a voice recognition system, electronic switches and buttons, or motion sensing devices and switches.

The mobile or transportable device may also include an update portal for updating the database.

The mobile or transportable device may further include a signal sampling circuitry for performing pattern identification and pattern recognition of radio broadcast programming.

In one embodiment, the computer component includes a microcontroller, or the likes.

In one embodiment, the radio operating component comprises one or more receivers, one or more transmitters, one or more transceivers, or a combination thereof.

In one embodiment, the radio operating component comprises a primary receiver for receiving the radio signal from one of the fixed location radio communication facilities and a secondary receiver for continuously scanning a relevant radio frequency spectrum in order to sense and confirm which one of the fixed location radio communication facilities presents in the database is reliably usable at the current location of the mobile or transportable device.

In one embodiment, the radio operating component operates using spread spectrum communication protocols.

In one embodiment, the radio operating component is capable of receiving radio communications from an earth orbiting satellite broadcast facility in order to expand program selection and choices.

In one embodiment, the location determining component comprises a global positioning system (GPS) based locator, an inertial guidance system, or a terrain recognition system.

In one embodiment, the database is operably changeable and updateable through linkage to the internet by smart phones, smart phone networks, radio broadcast, satellite radio broadcast, or by insertion of a portable memory device.

In one embodiment, the radio communication parameters further comprise radio or TV broadcast program schedules associated with each of the fixed location radio communication facilities.

In one embodiment, the radio communication parameters further comprise information of programs and program schedules that are broadcast in duplicate and simultaneously by multiple radio communication facilities in different locations.

In one embodiment, the database contains information organized in a matrix pattern of adjoining squares defined by geographic longitude and latitude coordinates that cover a defined geographic area, wherein each matrix square is populated by data with digital designations of fixed location radio communication facilities that are detectable, based on signal strength, when the mobile or transportable device locates in that specific geographic matrix square, wherein for each radio communication facility there is a digital representation of the probable signal strength present at current time in each matrix square based upon calculations using the published propagation maps of the fixed location broadcast facilities, or by calculations based upon terrain, distance between the mobile or transportable device and the broadcast station, respective transmit power, frequency, modulation type, and antenna gain.

In one embodiment, the database contains digital identifying codes that categorize program content of broadcast into groups including sports commentary, football games, baseball games, basketball games, religious news, religious programming, alt-right news, alt-left news, syndicated news commentary, network news, programming in Spanish and other languages, music programming and specifically types of music programming including retro rock music, oldies rock music, modern country, retro country, bluegrass; and other types of broadcast programming groups or categories.

In one embodiment, the digital identifying codes identify those fixed location broadcast facilities that carry specific program content that is simultaneously broadcast at multiple fixed location radio communication facilities.

In one embodiment, the mobile or transportable device is connectable to the internet using a smart phone, a direct hardwire connection, or a radio frequency link including Bluetooth so that the mobile or transportable device is operably accessible to broadcasting of digital radio stations on the internet in order to expand program selections and choices and to provide additional connectivity to syndicated or simultaneous broadcast programs that are used when other means of program reception fails.

In one aspect of the invention, a mobile or transportable device for radio communications comprises a mobile platform. The mobile platform comprises at least one antenna (e.g., Antenna in FIG. 5); a radio operating component (e.g., Radio in FIG. 5) coupled with the at least one antenna for receiving and/or transmitting radio signals; and a microcontroller (e.g., Microcontroller in FIG. 5) coupled with the radio operating component, configured such that when a radio signal received by the radio operating component from one of fixed location radio communication facilities is weaker than a threshold value, the microcontroller searches radio communication parameters of a closest radio communication facility to a current location of the mobile or transportable device, and operably retunes the mobile or transportable device according to the radio communication parameters of the closest radio communication facility.

Figure 5:
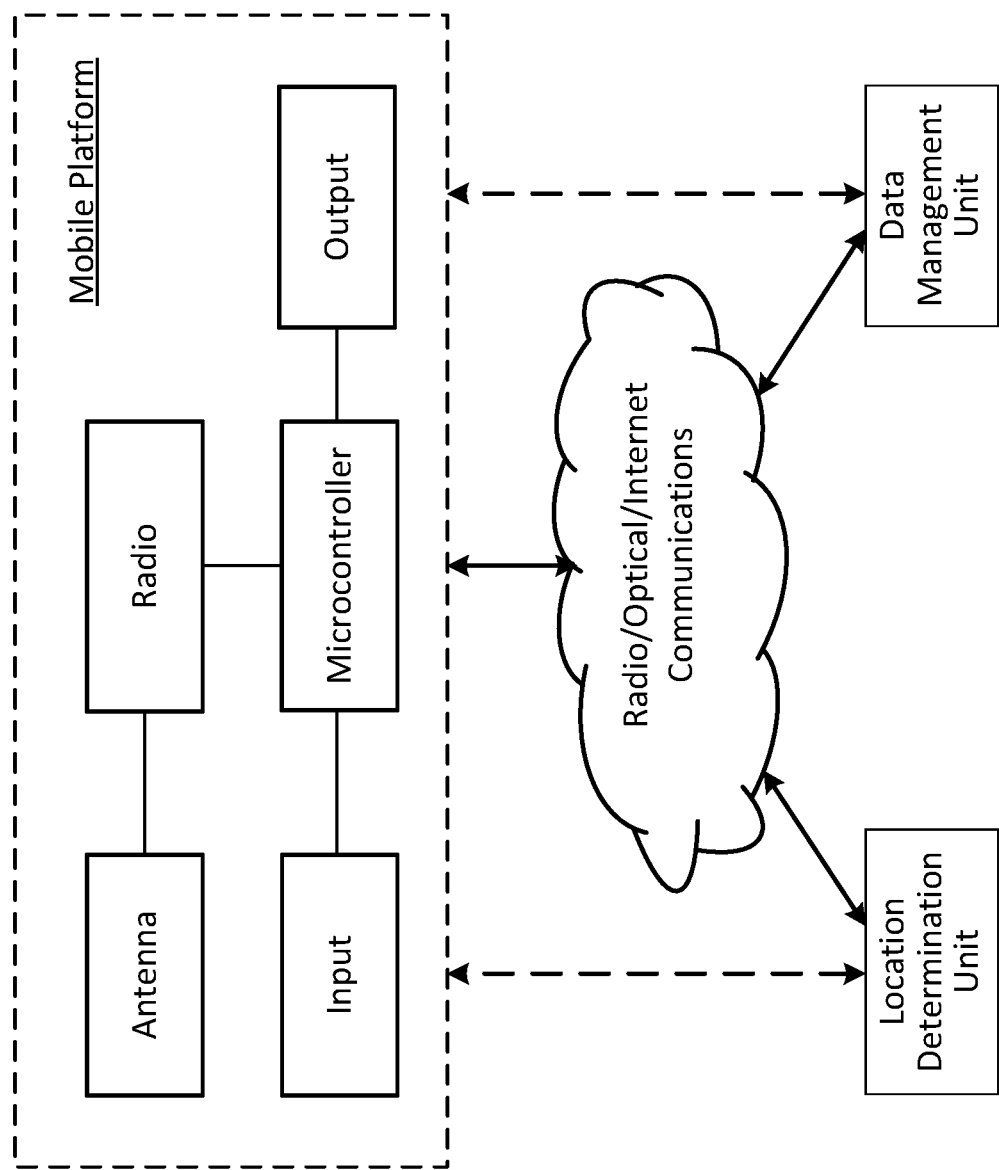
FIG. 5 illustrates how remotely located computer and data management facilities can be connected to the mobile or transportable device by radio, optical, hardwire or the internet in order to carry out certain functions necessary for the function of the mobile or transportable device eliminating the need for all of the device components to be co-located on or in the mobile platform according to embodiments of the present invention.

FIG. 5 illustrates how remotely located location determination and data management facilities can be connected to the mobile platform by radio, optical, hardwire, or the internet in order to carry out certain functions necessary for the function of the invented device eliminating the need for all of the invented device components to be co-located on or in the mobile platform. These components are connected in real time or near real time by radio, optical, hard wire, or internet connectivity. Any or any combination of these connective resources can be utilized to accomplish the connectivity. In this exemplar embodiment, certain functions of the invented device may be performed remotely away from the mobile platform.

In certain embodiment, the location determination and data management facilities can be directly connected to the mobile platform by wires (e.g., represented by dashed arrows in FIG. 5).

In one embodiment, the mobile platform further comprises an output component (e.g., Output in FIG. 5) for audio output, video output, data output, text output, or a combination thereof, wherein the output component comprises one or more speakers, one or more headphones, one or more displays, one or more video devices, or a combination thereof.

In one embodiment, the mobile platform further comprises a user interface component (e.g., Input in FIG. 5) for inputting user instructions, wherein the user interface component comprises a key pad, a touch screen, a voice recognition system, electronic switches and buttons, or motion sensing devices and switches.

In one embodiment, the radio operating component (e.g., Radio in FIG. 5) comprises one or more receivers, one or more transmitters, one or more transceivers, or a combination thereof.

In one embodiment, the radio operating component comprises a primary receiver for receiving the radio signal from one of the fixed location radio communication facilities and a secondary receiver for continuously scanning a relevant radio frequency spectrum in order to sense and confirm which one of the fixed location radio communication facilities is reliably usable at the current location of the mobile or transportable device.

The primary radio or radios, transceiver or transceivers, user interface and output, power supply and the antenna or antennas are normally located in or on the mobile platform. For example, but not limited to, components and functions that may be located separately and remotely are a computer or multiple computers, a database or multiple databases, as necessary to carry out the functions of the invented device.

In one embodiment, the radio operating component is capable of receiving radio communications from an earth orbiting satellite broadcast facility in order to expand program selection and choices.

In one embodiment, the mobile or transportable device further comprises a location determining component (e.g., Location Determination Unit in FIG. 5) for determining its current location of the mobile or transportable device.

In one embodiment, the location determining component comprises a global positioning system (GPS) based locator, an inertial guidance system, a terrain recognition system, or a smart phone.

In one embodiment, the location determining component is integrated in the mobile platform, or an individual component shown in FIG. 5, and is in communication with the mobile platform through a wired communication protocol, a wireless communication protocol, a radio communication protocol, an optical communication protocol, and/or an internet communication protocol.

In one embodiment, a cell phone network is used to calculate the location of the mobile platform in which the mobile or transportable device is currently located and to communicate by radio transmission that location information to the mobile or transportable device.

In one embodiment, the mobile or transportable device further comprises at least one data server (e.g., Data Management Unit in FIG. 5) containing radio communication parameters of the fixed location radio communication facilities that operably are searchable by the microcontroller, wherein the radio communication parameters comprise a location, transmitting power, hours of operation, antenna parameter, frequency, modulation type, and connection protocol of each of the fixed location radio communication facilities.

In one embodiment, the radio communication parameters further comprise radio or TV broadcast program schedules associated with each of the fixed location radio communication facilities, and/or information of programs and program schedules that are broadcast in duplicate and simultaneously by multiple radio communication facilities in different locations.

In one embodiment, the at least one data server is operably changeable and updateable by smart phones, smart phone networks, radio broadcast, satellite radio broadcast.

In one embodiment, the at least one data server comprises one or more databases, one or more data servers, and/or one or more cloud servers.

In one embodiment, the at least one data server comprises one or more portable memory devices. For example, the portable memory device can be, but not limited to, a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one embodiment, the at least one data server contains information organized in a matrix pattern of adjoining squares defined by geographic longitude and latitude coordinates that cover a defined geographic area, wherein each matrix square is populated by data with digital designations of fixed location radio communication facilities that are detectable, based on signal strength, when the mobile or transportable device locates in that specific geographic matrix square, wherein for each radio communication facility there is a digital representation of the probable signal strength present at current time in each matrix square based upon calculations using the published propagation maps of the fixed location broadcast facilities, or by calculations based upon terrain, distance between the mobile or transportable device and the broadcast station, respective transmit power, frequency, modulation type, and antenna gain.

In one embodiment, the at least one data server contains digital identifying codes that categorize program content of broadcast into groups including sports commentary, football games, baseball games, basketball games, religious news, religious programming, alt-right news, alt-left news, syndicated news commentary, network news, programming in Spanish and other languages, music programming and specifically types of music programming including retro rock music, oldies rock music, modern country, retro country, bluegrass; and other types of broadcast programming groups or categories, wherein the digital identifying codes identify those fixed location broadcast facilities that carry specific program content that is simultaneously broadcast at multiple fixed location radio communication facilities.

In one embodiment, the at least one data server is in communication with the mobile platform through a wired communication protocol, a wireless communication protocol, a radio communication protocol, and/or an internet communication protocol.

In one embodiment, the mobile or transportable device further comprises a signal sampling circuitry for performing pattern identification and pattern recognition of radio broadcast programming.

In one embodiment, the mobile or transportable device is connectable to the internet using a smart phone, a direct hardwire connection, or a radio frequency link including Bluetooth so that the mobile or transportable device is operably accessible to broadcasting of digital radio stations on the internet in order to expand program selections and choices and to provide additional connectivity to syndicated or simultaneous broadcast programs that are used when other means of program reception fails.

Figure 2:
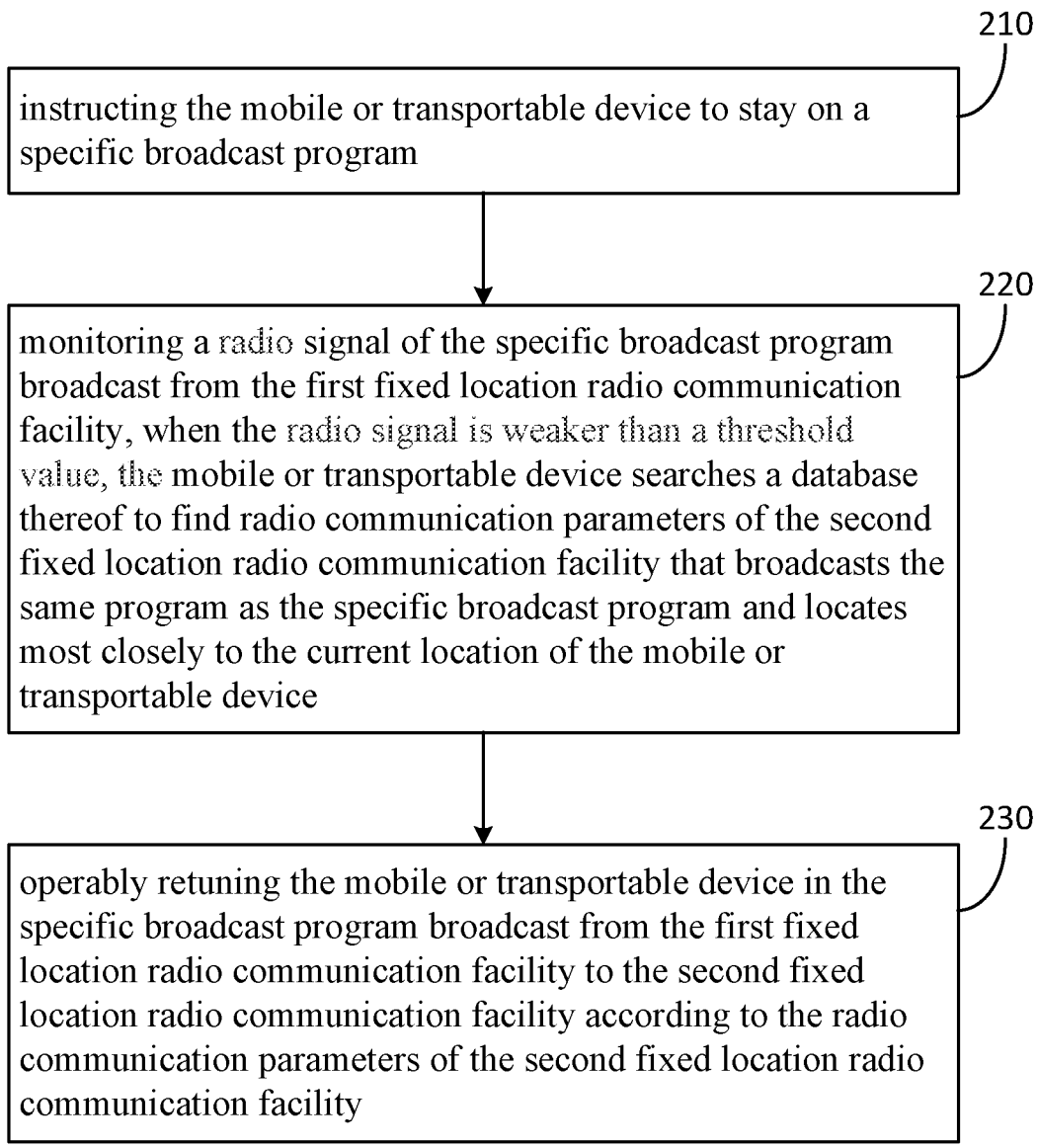
FIG. 2 shows schematically a flowchart for automatically retuning a specific broadcast program from a first fixed location radio communication facility to a second fixed location radio communication facility for a mobile or transportable device according to one embodiment of the present invention.

Referring to FIG. 2, a method for automatically retuning a specific broadcast program from a first fixed location radio communication facility to a second fixed location radio communication facility for a mobile or transportable device is shown according to one embodiment of the invention.

In this exemplary embodiment, the method includes the following steps. At step 210, the mobile or transportable device is instructed to stay on a specific broadcast program. The instruction can be made by a user via the user interface component or other input means.

At step 220, the mobile or transportable device monitors a radio signal of the specific broadcast program broadcast from the first fixed location radio communication facility, when the radio signal is weaker than a threshold value, the mobile or transportable device searches a database thereof to find radio communication parameters of the second fixed location radio communication facility that broadcasts the same program as the specific broadcast program and locates most closely to the current location of the mobile or transportable device.

At step 230, the mobile or transportable device is retuned in the specific broadcast program broadcast from the first fixed location radio communication facility to the second fixed location radio communication facility according to the radio communication parameters of the second fixed location radio communication facility.

In one embodiment, the method further includes establishing the rate and direction of travel of the mobile or transportable device by reviewing the previous travel path of the mobile or transportable device; projecting its future travel area of the mobile or transportable device; and selecting a new fixed location radio communication facility according to the strength of the radio signal in the future travel area utilizing broadcast propagation data in the database of the mobile or transportable device.

In one embodiment, the method further includes selecting of a group of fixed location radio communication facilities in a given locality specified by their common use mode.

In one embodiment, the method further includes selecting a local group of fixed location repeater stations or transceivers that are operably communicable with given limits of propagation and reception of the mobile or transportable device and the fixed location repeater stations; and retrieving local repeater station frequency and operating protocols from the database, so as to enable the user to scan, monitor, and use the local repeater stations for communication or emergency use.

In one embodiment, the method further includes selecting a group of broadcast stations broadcasting a category of program material or content and to scan those stations until the user selects via input/command one station.

In one embodiment, the method further includes calculating transmitted signal strength of a fixed location radio communication facility at the current location of the mobile or transportable device according to a formula of $$RPD = P*G/(4*\pi*D)^2,$$

where RPD is a receiver power density, P is a transmitted power, G is a transmitting antenna gain, and D is a distance between the transmitter of the fixed location radio communication facility and the receiver of the mobile or transportable device, and wherein RPD is measured in Watts per square meter.

It should be noted that all or a part of the steps according to the embodiments of the present invention is implemented by hardware or a program instructing relevant hardware. Yet another aspect of the invention provides a non-transitory tangible computer-readable medium storing instructions which, when executed by one or more processors, cause the mobile or transportable device to perform the above method for automatically retuning a specific broadcast program from a first fixed location radio communication facility to a second fixed location radio communication facility. The computer executable instructions or program codes enable a computer or a similar computing system to complete various operations in the above disclosed method for privilege management. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

In one embodiment, the mobile or transportable device for radio communications records its current location and automatically or semi-automatically establishes, and/or maintains, and/or improves and/or enhances communication with fixed location radio communication facilities. The mobile or transportable device can communicate audio, video, or data content. The mobile or transportable device can transmit, receive or accomplish both (transceiver). The mobile or transportable device uses an internal database which contains one or more data sets. What is established as unique by the invention is the internal capability of calculating and determining the potential success of communicating with fixed location radio frequency stations, and then establishing and/or maintaining that communication link based on that internal capability.

There can be multiple data sets. For example, one data set contains information enabling the calculation of, or describing the signal strength of fixed location radio communication facilities in all geographic locations in which the present invention may practically be located. This data set may also contain receive and transmit parameters including but not limited to frequency, type of modulation, antenna parameters, transmit power and receiver sensitivity, hours of operation, transmit power limitations during certain daily time spans, and any other information which delineates the propagation of a fixed location radio communication facility signal. The mobile or transportable device may contain a radio receiver, a radio transmitter, a radio transceiver, any combination of these components, or more than one of each of these components. Therefore, the data sets respectively contain the necessary information to describe, for any given location, the fixed location radio facilities that can be communicated with reliably, given normal conditions.

Another data set contains information describing the scheduled programming of fixed location broadcast facilities.

An additional data set may contain information which identifies special fixed location radio communication facilities by the service which these facilities offer, or a special designated use, such as emergency communication.

Other data sets may be included in the invention's database dependent on differing uses of the device.

In certain embodiments, the mobile or transportable device operates by sensing and establishing its geographic location, searching the first database, and determining the fixed location radio communication facilities with which it can receive and/or transmit (usable facilities). Following the identification of the usable fixed location facilities, and based upon user demands, the mobile or transportable device can tune a single station to receive, transmit to or both. The mobile or transportable device can display video or output audio or display data. The mobile or transportable device can also combine these outputs. The mobile or transportable device is also capable of recording all three forms of radio frequency content for later use. The mobile or transportable device may also scan all the specified type of usable fixed location radio communication facilities, or enable the user to select one or more of the usable facilities to establish communication.

In certain embodiments, the mobile or transportable device has multiple components: one or more radio receivers, transceivers, or transmitter; a control computer; a clock; a database having one or multiple data sets; a manual user interface, hard wired and/or wireless and/or a voice recognition system for user interface; one or more antennas; an electronic location determining component such as a GPS; appropriate output devices for specific content, such as video, audio and data; a power source; and other components to enhance functionality.

In certain embodiments, the mobile or transportable device may be installed or attached to a vehicle that is capable of traveling more than 3,500 feet; or it may be portable or transportable because of its size weight and design. In certain embodiments, the mobile or transportable device can be moved into and out of the communication range of fixed location radio communication facilities.

Figure 4:
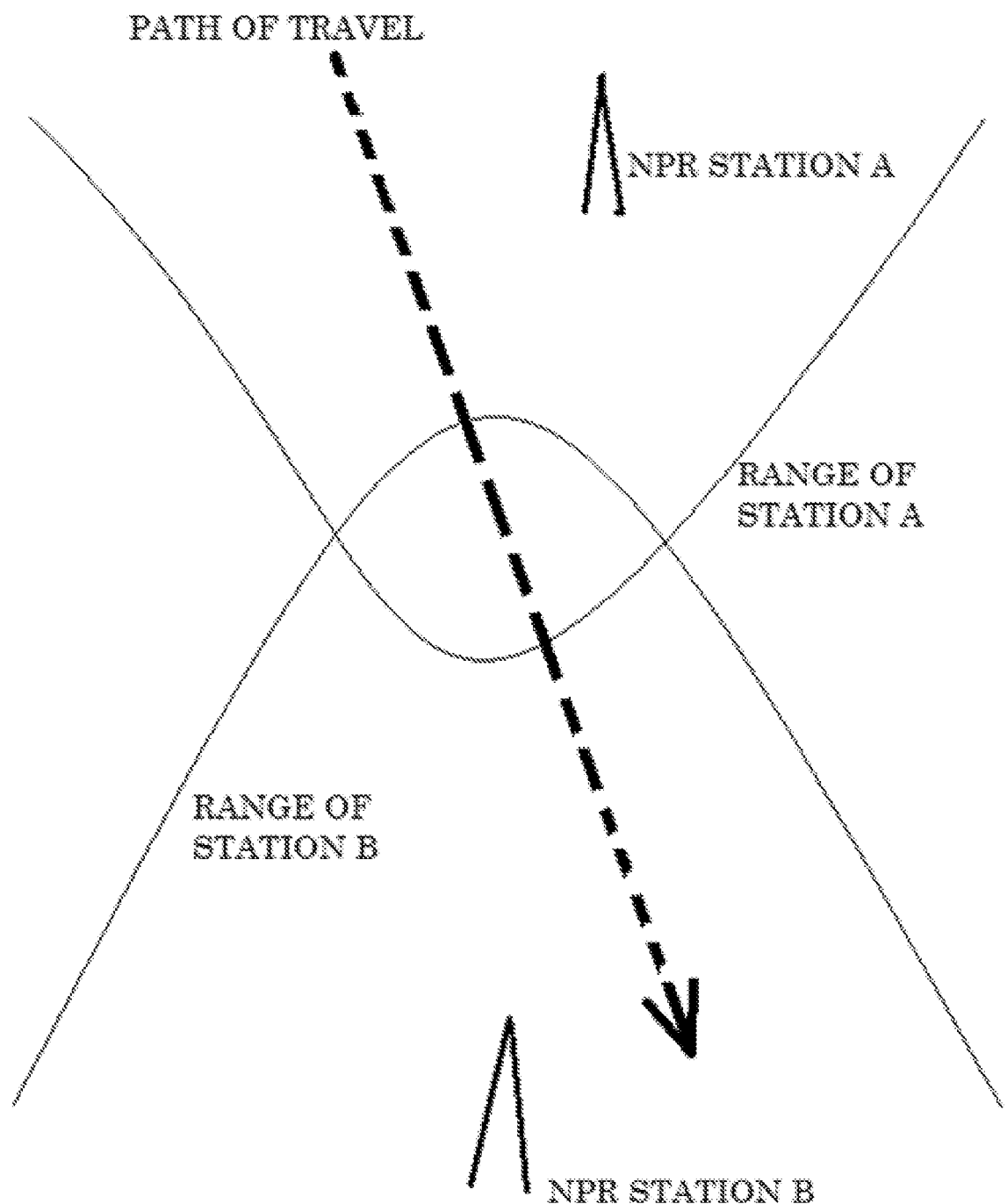
FIG. 4 illustrates one exemplary example of how the mobile or transportable device can maintain continuous program reception as automobile transverses from the range of one fixed location broadcasting station to the range of another where both fixed broadcast stations are simultaneously transmitting the same program content. An example of such program content is the National Public Radio's afternoon news show—"All Things Considered".

An exemplary embodiment of the mobile or transportable device is illustrated in FIG. 4. As an automobile travels from one metro area to another it will probably transverse out of the reception range of some of the fixed location AM and FM broadcast stations located in the metro area it was leaving. Additionally as the automobile approaches the second metro area it will come within the reception range of fixed location AM and FM broadcast stations located in that second metro area. In this example, two radio broadcast stations located separately in the two metro areas are broadcasting simultaneously the same program content such as National Public Radio's news broadcast "All Things Considered".

By design the FCC, in cooperation with broadcasters, attempts to insure that most national broadcast program content can be received throughout the country. As a result there is some overlap of reception between simulcast broadcasts between metro areas. In those instances the mobile or transportable device can maintain reception of a specific program broadcast as the automobile transports from one reception area to another; and in this example it would be National Public Radio's news program—"All Things Considered".

The mobile or transportable device accomplishes this by automatically retuning the radio receiver from the frequency of the first broadcast station to the frequency of the second broadcast station. This retuning is accomplished by the following steps. Firstly, the user commands the mobile or transportable device through the user interface to stay on the "All Things Considered" program. Secondly, the mobile or transportable device monitors the signal strength of the broadcast. As the signal strength weakens, the mobile or transportable device searches its database to identify another station which is broadcasting the same program content, and additionally has larger signal strength at the current location of the automobile. The third step is that the control computer directs the radio to be re-tuned to the frequency of the station which has larger signal strength. More sophisticated re-tuning can be accomplished by the control computer establishing the rate and direction of travel by review of the previous travel path of the automobile and projecting its future travel area; then selecting the new station according to the signal strength in the future travel area utilizing broadcast propagation data in the mobile or transportable device's database.

Another exemplary embodiment of the mobile or transportable device is the selection of a group of fixed location radio communication facilities in a given locality specified by their common use mode. These selected facilities can then be used or operated for specific purposes. Amateur radio operators have erected automatic repeater stations (2 Meter, 220 Megahertz and 440 Megahertz) in most metropolitan areas in the United States and other countries. These repeater stations are inherently short range, normally less than 20 miles. These automated stations work on differing specific frequencies and utilize differing operating protocols. While this information is published through many sources and is available on the internet, the stations' operating data must be inserted manually. If there are a large number of repeaters in a given area, say 25 to 50, it is a burden to the operator of a mobile station to manually insert all of this information, as he enters a new operating area. Additionally some of these repeater stations are designated to support emergency communication services, and these designations are also published.

The mobile or transportable device, at the users command, can retrieve local repeater station frequency and operating protocols from its database, and enable the user to scan, monitor, and use the local repeater stations for communication or emergency use without completing by hand, the task of entering those respective frequencies or protocols. So as the user travels from one area to another the present invention can automatically insert the operating data of those repeater stations that can be reached from the traveler's current location.

Using this capability emergency service providers, police, military emergency service operations, utility service providers, and fire and rescue mobile units can use the present inventions capabilities to establish, maintain, or make more convenient, radio frequency communication when they travel from one local to another.

In one exemplary embodiment, the mobile or transportable device has, among other things, the following interconnected components:

(A). a radio frequency operating component which may include a receiver and/or transmitter or multiple receivers and/or transmitters, which can transmit and/or receive, modulate and/or demodulate radio frequency signals and which may operate using spread spectrum communication protocols;

(B). an electronic location determining component including but not limited to a GPS based locator, an inertial guidance system, or a terrain recognition system;

(C). a component which is an antenna or an array of multiple antennas;

(D). a suitable output component directing to the user either audio output; video output, data output, text output or any combination of those outputs, where the output component may include speakers, headphones, LCD screens or other video devices;

(E). a computer component to control all aspects of the operation of the invented device and which includes any combination of the following parts: a central processing unit, random access memory, updateable read only memory for the firmware, a hard drive which may be solid state, an operating system, and program software, analogue to digital converting circuitry, digital to analogue converting circuitry, digital input and output circuitry, and power switches to direct commands to other components of the invented device;

(F). a database component containing radio frequency wireless communication parameters of fixed location radio frequency transmitter, receiver or transceiver facilities, and their location expressed in normal longitude and latitude notation, where the communication parameters include but are not limited to location, transmitting power, hours of operation, parameters of the antenna system, antenna/antennas gain, the effective altitude of the antenna/antennas, and any other technical factors affecting the propagation of the signal, frequency, type of modulation, and connection protocols, where the database also contains the sensitivity, measured in micro volts, of the invented device's receiver or receivers along with the transmitting power, measured in watts, of any integrated transmitting components;

(G). a user interface component to pass user instructions to the controlling computer which can be, but not limited to, a key pad, electronic switches and buttons, touch screen, voice recognition system, motion sensing devices and switches;

(H). a receive and send interface component to enable the database to be changed, modified, or updated through linkage to the internet by smart phones, smart phone networks, radio broadcast, satellite radio broadcast or by insertion of a portable memory device, where such interface will also enable sending data from the invented device through the internet to data collection servers;

(I). software which enables the system to operate and to perform a unique function which is to automatically establish and/or maintain radio frequency communication between the invention device and single or multiple fixed location radio frequency transmitter or transceiver facilities enabled by information contained in the database set forth above.

(J). a power source and a clock; and (K). a system electric bus to provide electrical interconnection to the invented device's components.

Furthermore, the database may contain an additional data content of Radio or TV broadcast program schedules associated with the transmitting facilities.

The database may contain an additional data content of identification of programs and program schedules which are broadcast in duplicate and simultaneously by multiple broadcast facilities in differing locations.

The database may contain an additional data content of information organized in a matrix pattern of adjoining squares defined by geographic longitude and latitude coordinates which cover a defined geographic area, such as a country, a county or a continent or subsections of each. The square can be from 1000 feet by 1000 feet in size to 5 miles by 5 miles in size, but each complete matrix contains uniform, same sized squares. Each matrix square is populated by data with digital designations of fixed location radio communication facilities which can reasonably be expected, based on signal strength, to be detected by the invented device, when it is located in that specific geographic matrix square. Additionally, for each such radio facility there is a digital representation of the probable signal strength present at current time in each matrix square based upon calculations using the published propagation maps of the fixed location broadcast facilities, or by calculations based upon terrain, distance between the invented device and the broadcast station, respective transmit power, frequency, modulation type, and antenna gain.

The database may contain an additional data content of digital identifying codes which categorize program content of broadcast into groups, such as, but not limited to, sports commentary, football games, baseball games, basketball games, religious news, religious programming, alt-right news, alt-left news, syndicated news commentary, network news, programming in Spanish and other languages, music programming and specifically types of music programming such as, but not limited to, retro rock music, oldies rock music, modern country, retro country, bluegrass; and other types of broadcast programming groups or categories.

The database may contain an additional data content of digital identifying codes which identify those fixed location broadcast facilities which carry specific program content which is simultaneously broadcast at many fixed location broadcast facilities. A separate code is used for each specific program content such as the NPR new program "All Things Considered".

The mobile or transportable device may have a secondary receiver whose function is to continuously scan the relevant radio frequency spectrum in order to sense and confirm which fixed location radio communication facilities present in the database can be reliably used at the current location of the invented device. Such secondary receiver can either operate as the primary receiver and demodulate the radio signal, or sense only signal strength, or it could have both capabilities.

The mobile or transportable device may also have signal sampling circuitry and signal sampling software to perform pattern identification and pattern recognition of Radio Broadcast programming.

Any of the invented device's components can be replaced by external components that are housed or installed in other devices and/or vehicles provided those external components are capable of performing the necessary tasks and secondly, they will be transported with the invented device, and thirdly an interface circuitry can be applied that enables the external component to function fully to perform the necessary tasks.

Figure 3:
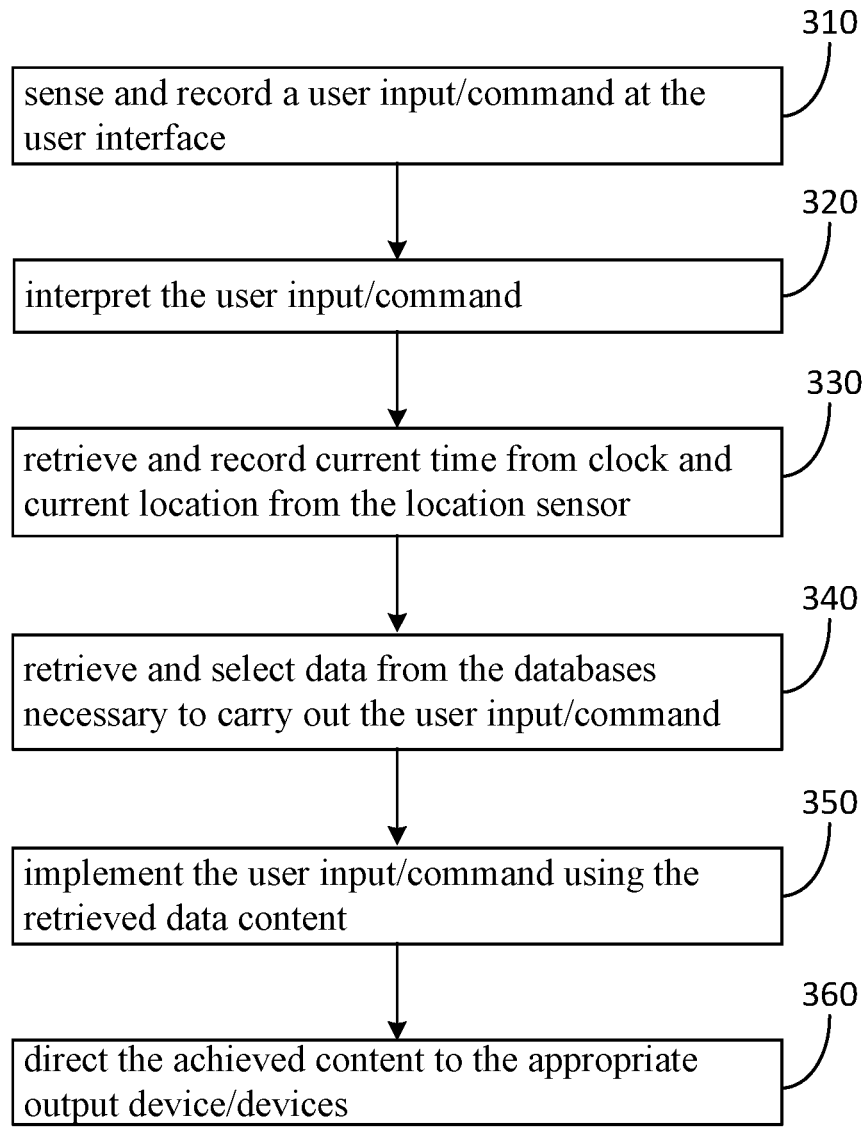
FIG. 3 shows schematically a flowchart for automatically tuning of a mobile or transportable device

In one embodiment, in operation, the computer component of the mobile or transportable device accepts and carries out user input/commands, which includes, as shown in FIG. 3, but are not limited to, to sense and record a user input/command at the user interface (step 310); interpret the user input/command (step 320); retrieve and record current time from clock and current location from the location sensor (step 330); retrieve and select data from the databases necessary to carry out the user input/command (step 340); implement the user input/command using the retrieved data content (step 350); and direct the achieved content to the appropriate output device/devices (step 360).

In one embodiment, the mobile or transportable device operably tunes in a specific broadcast program and maintains its reception during travel where ever possible.

In one embodiment, the mobile or transportable device operably selects a group of broadcast stations broadcasting a category of program material or content and scans those stations until the user selects via input/command one station.

In one embodiment, the mobile or transportable device operably selects a local group of fixed location repeater stations or transceivers that can be communicated with given the limits of propagation and reception of the invented device and the fixed locations stations; and then enables the user to scan, receives or transmits to any of those selected repeater stations and/or transceivers.

The mobile or transportable device may be connected through the interface component using a smart cell phone, direct hardwire connection, radio frequency link such as Bluetooth so that the smart cell phone can provide the invented device access to digital radio stations broadcast on the internet in order to expand program selection and choices; and to provide additional connectivity to syndicated or simultaneous broadcast programs which can used when other means of program reception fails.

In one embodiment, data recording the specifics of the operation of the mobile or transportable device can be stored for later transfer of that collected data at specified times through the internet to a data storage server, where one set of data from one specific invented device is combined and aggregated with data from other devices which can be subject to analysis. Such analysis can provide intelligence about the user operation of the invented devices which can be used to improve service or aid in marketing of products.

According to the invention, the mobile or transportable device can be applied to any types of vehicles, such as personal vehicles, police vehicles, rescue vehicles, other transitory emergency vehicles, motorcycles, and boats. From time to time, all of these vehicles may be called to travel from one community to another which may or may not share the same frequency alignment. On occasion these vehicles travel long distances. In other cases they use these devices in other countries. The invention would have the widespread applications in these or other situations.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. A mobile or transportable device for radio communications, comprising a mobile platform, wherein the mobile platform comprises:
at least one antenna;
a radio operating component coupled with the at least one antenna for receiving and/or transmitting radio signals;
a microcontroller coupled with the radio operating component, configured such that when a radio signal received by the radio operating component from one of fixed location radio communication facilities is weaker than a threshold value, the microcontroller searches radio communication parameters of a closest radio communication facility to a current location of the mobile or transportable device, and operably retunes the mobile or transportable device according to the radio communication parameters of the closest radio communication facility; and
at least one data server containing radio communication parameters of the fixed location radio communication facilities that operably are searchable by the microcontroller, wherein the radio communication parameters comprise a location, transmitting power, hours of operation, antenna parameter, frequency, modulation type, and connection protocol of each of the fixed location radio communication facilities, wherein the radio communication parameters further comprise radio or TV broadcast program schedules associated with each of the fixed location radio communication facilities, and/or information of programs and program schedules that are broadcast in duplicate and simultaneously by multiple radio communication facilities in different locations;
wherein the at least one data server further contains information organized in a matrix pattern of adjoining squares defined by geographic longitude and latitude coordinates that cover a defined geographic area, wherein each matrix square is populated by data with digital designations of fixed location radio communication facilities that are detectable, based on signal strength, when the mobile or transportable device locates in that specific geographic matrix square, wherein for each radio communication facility there is a digital representation of the probable signal strength present at current time in each matrix square based upon calculations using the published propagation maps of the fixed location broadcast facilities, or by calculations based upon terrain, distance between the mobile or transportable device and the broadcast station, respective transmit power, frequency, modulation type, and antenna gain;
wherein the at least one data server further contains digital identifying codes that categorize program content of broadcast into groups including sports commentary, football games, baseball games, basketball games, religious news, religious programming, alt-right news, alt-left news, syndicated news commentary, network news, programming in Spanish and other languages, music programming and specifically types of music programming including retro rock music, oldies rock music, modern country, retro country, bluegrass; and other types of broadcast programming groups or categories, wherein the digital identifying codes identify those fixed location broadcast facilities that carry specific program content that is simultaneously broadcast at multiple fixed location radio communication facilities; and
wherein the radio operating component comprises a primary receiver for receiving the radio signal from one of the fixed location radio communication facilities and a secondary receiver for continuously scanning a relevant radio frequency spectrum in order to sense and confirm which one of the fixed location radio communication facilities is reliably usable at the current location of the mobile or transportable device.

2. The mobile or transportable device of claim 1, wherein the mobile platform further comprises an output component for audio output, video output, data output, text output, or a combination thereof, wherein the output component comprises one or more speakers, one or more headphones, one or more displays, one or more video devices, or a combination thereof.

3. The mobile or transportable device of claim 1, wherein the mobile platform further comprises a user interface component for inputting user instructions, wherein the user interface component comprises a key pad, a touch screen, a voice recognition system, electronic switches and buttons, or motion sensing devices and switches.

4. The mobile or transportable device of claim 1, wherein the radio operating component comprises one or more receivers, one or more transmitters, one or more transceivers, or a combination thereof.

5. The mobile or transportable device of claim 1, wherein the radio operating component is capable of receiving radio communications from an earth orbiting satellite broadcast facility in order to expand program selection and choices.

6. The mobile or transportable device of claim 1, further comprising a location determining component for determining its current location of the mobile or transportable device.

7. The mobile or transportable device of claim 6, wherein the location determining component comprises a global positioning system (GPS) based locator, an inertial guidance system, a terrain recognition system, or a smart phone.

8. The mobile or transportable device of claim 6, wherein the location determining component is integrated in the mobile platform, or an individual component, and is in communication with the mobile platform through a wired communication protocol, a wireless communication protocol, a radio communication protocol, and/or an internet communication protocol.

9. The mobile or transportable device of claim 1, wherein a cell phone network is used to calculate the location of the mobile platform in which the mobile or transportable device is currently located and to communicate by radio transmission that location information to the mobile or transportable device.

10. The mobile or transportable device of claim 1, wherein the at least one data server is operably changeable and updateable by smart phones, smart phone networks, radio broadcast, satellite radio broadcast.

11. The mobile or transportable device of claim 1, wherein the at least one data server comprises one or more databases, and/or one or more cloud servers.

12. The mobile or transportable device of claim 1, wherein the at least one data server comprises one or more portable memory devices.

13. The mobile or transportable device of claim 1, wherein the at least one data server is in communication with the mobile platform through a wired communication protocol, a wireless communication protocol, a radio communication protocol, and/or an internet communication protocol.

14. The mobile or transportable device of claim 1, being connectable to the internet using a smart phone, a direct hardwire connection, or a radio frequency link including Bluetooth so that the mobile or transportable device is operably accessible to broadcasting of digital radio stations on the internet in order to expand program selections and choices and to provide additional connectivity to syndicated or simultaneous broadcast programs that are used when other means of program reception fails.

15. The mobile or transportable device of claim 1, further comprising a signal sampling circuitry for performing pattern identification and pattern recognition of radio broadcast programming.

* * * * *